US012431343B2

(12) United States Patent
Jarrell et al.

(10) Patent No.: US 12,431,343 B2
(45) Date of Patent: Sep. 30, 2025

(54) INDUCTIVE DETECTOR WITH INTEGRATED AMPLIFIER

(71) Applicant: Waters Technologies Corporation, Milford, MA (US)

(72) Inventors: Joseph A. Jarrell, Newton Highlands, MA (US); Patrick Brophy, Newton Highlands, MA (US); Alistair J. Schofield, Oldham (GB)

(73) Assignee: Waters Technologies Corporation, Milford, MA (US)

(*) Notice: Subject to any disclaimer, the term of this patent is extended or adjusted under 35 U.S.C. 154(b) by 377 days.

(21) Appl. No.: 18/066,067

(22) Filed: Dec. 14, 2022

(65) Prior Publication Data

US 2023/0187193 A1 Jun. 15, 2023

Related U.S. Application Data

(60) Provisional application No. 63/289,951, filed on Dec. 15, 2021.

(51) Int. Cl.
*H01J 49/02* (2006.01)
*H01J 49/00* (2006.01)

(52) U.S. Cl.
CPC ........ *H01J 49/027* (2013.01); *H01J 49/0031* (2013.01)

(58) Field of Classification Search
CPC ............................ H01J 49/027; H01J 49/0031
See application file for complete search history.

(56) References Cited

U.S. PATENT DOCUMENTS 5,770,857 A 6/1998 Fuerstenau et al.
5,880,466 A 3/1999 Benner
5,892,227 A * 4/1999 Schieber ................ H10F 77/12 257/E31.026
6,384,395 B1 * 5/2002 Martin .................. H04N 25/78 250/214 R
6,480,278 B1 11/2002 Fuerstenau et al.
6,576,899 B2 6/2003 Sinha et al.
6,744,042 B2 6/2004 Zajfman et al.
6,747,272 B2 6/2004 Takahashi
6,753,523 B1 6/2004 Whitehouse et al.
(Continued)

FOREIGN PATENT DOCUMENTS

CN 1836308 A 9/2006
CN 101151704 A 3/2008
(Continued)

OTHER PUBLICATIONS

Kukura, P., et al., "High-speed nanoscopic tracking of the position and orientation of a single virus", Nature Methods 6 (12);923-927 (2009).

(Continued)

*Primary Examiner* — Nicole M Ippolito
(74) *Attorney, Agent, or Firm* — Goodwin Procter LLP

(57) ABSTRACT

An image charge detection assembly for a mass spectrometer comprising an image charge detector that is housed within an electrically conductive shielding enclosure, and a preamplifier, wherein at least an input stage of the preamplifier, which is electrically connected to the detector, is housed with the detector within the enclosure.

17 Claims, 3 Drawing Sheets

(56) References Cited

U.S. PATENT DOCUMENTS

| | | | |
|---|---|---|---|
| 6,858,840 | B2 | 2/2005 | Berkout et al. |
| 6,888,130 | B1 | 5/2005 | Gonin |
| 6,967,326 | B2 | 11/2005 | Pai et al. |
| 6,987,264 | B1 | 1/2006 | Whitehouse et al. |
| 7,002,166 | B2 | 2/2006 | Jamieson et al. |
| RE39,099 | E | 5/2006 | Krutchinsky et al. |
| 7,078,679 | B2 | 7/2006 | Westphall et al. |
| 7,161,146 | B2 | 1/2007 | Doroshenko et al. |
| 7,170,053 | B2 | 1/2007 | Shvartsburg et al. |
| 7,176,455 | B1 | 2/2007 | Whitehouse et al. |
| 7,217,919 | B2 | 5/2007 | Boyle et al. |
| 7,361,888 | B1 | 4/2008 | Boyle et al. |
| 7,365,314 | B2 | 4/2008 | Lee et al. |
| 7,385,187 | B2 | 6/2008 | Verentchikov et al. |
| 7,482,581 | B2 | 1/2009 | Lange et al. |
| 7,482,582 | B2 | 1/2009 | Raznikov et al. |
| 7,547,878 | B2 | 6/2009 | Schultz et al. |
| 7,564,026 | B2 | 7/2009 | Vestal |
| 7,608,817 | B2 | 10/2009 | Flory |
| 7,820,961 | B2 | 10/2010 | Hashimoto et al. |
| 7,829,842 | B2 | 11/2010 | Makarov |
| 7,858,926 | B1 | 12/2010 | Whitehouse et al. |
| 7,880,136 | B2 | 2/2011 | Makarov et al. |
| 7,888,633 | B2 | 2/2011 | Franzen et al. |
| 7,952,070 | B2 | 5/2011 | Senko et al. |
| 7,960,690 | B2 | 6/2011 | Schwartz et al. |
| 7,982,871 | B2 | 7/2011 | Caro et al. |
| 8,101,910 | B2 | 1/2012 | Loboda |
| 8,115,165 | B2 | 2/2012 | Thomson |
| 8,237,111 | B2 | 8/2012 | Golikov et al. |
| 8,278,115 | B2 | 10/2012 | Coon et al. |
| 8,294,085 | B2 | 10/2012 | Ding |
| 8,294,086 | B2 | 10/2012 | Holle |
| 8,319,180 | B2 | 11/2012 | Nikolaev et al. |
| 8,334,504 | B2 | 12/2012 | Finlay et al. |
| 8,395,112 | B1 | 3/2013 | Bier |
| 8,399,827 | B1 | 3/2013 | Grothe |
| 8,455,815 | B2 | 6/2013 | Steiner et al. |
| 8,586,918 | B2 | 11/2013 | Brucker et al. |
| 8,664,590 | B2 | 3/2014 | Ding et al. |
| 8,796,619 | B1 | 8/2014 | Doroshenko et al. |
| 8,829,432 | B2 | 9/2014 | Stein |
| 8,853,620 | B2 | 10/2014 | Lange |
| 8,921,772 | B2 | 12/2014 | Verenchikov |
| 8,921,779 | B2 | 12/2014 | Grothe, Jr. |
| 8,933,397 | B1 | 1/2015 | Hanson |
| 8,963,075 | B2 | 2/2015 | Chen et al. |
| 9,000,364 | B2 | 4/2015 | Ermakov et al. |
| 9,018,580 | B2 | 4/2015 | Lemoine et al. |
| 9,035,245 | B2 | 5/2015 | Glasmachers et al. |
| 9,043,164 | B2 | 5/2015 | Makarov |
| 9,136,102 | B2 | 9/2015 | Grinfeld et al. |
| 9,224,586 | B2 | 12/2015 | Chen et al. |
| 9,299,546 | B2 | 3/2016 | Nikolaev |
| 9,312,119 | B2 | 4/2016 | Verenchikov |
| 9,324,547 | B2 | 4/2016 | Hauschild et al. |
| 9,324,551 | B2 | 4/2016 | Taniguchi et al. |
| 9,349,579 | B2 | 5/2016 | Kholomeev et al. |
| 9,366,650 | B2 | 6/2016 | Knochenmuss |
| 9,368,336 | B2 | 6/2016 | Xu et al. |
| 9,396,923 | B2 | 7/2016 | Kodera et al. |
| 9,455,128 | B2 | 9/2016 | Remes et al. |
| 9,460,905 | B2 | 10/2016 | Aizikov et al. |
| 9,520,280 | B2 | 12/2016 | Makarov |
| 9,543,131 | B2 | 1/2017 | Kuehn et al. |
| 9,548,195 | B2 | 1/2017 | Hock et al. |
| 9,666,423 | B2 | 5/2017 | Benner |
| 9,714,919 | B2 | 7/2017 | Brucker et al. |
| 9,779,930 | B2 | 10/2017 | Guna |
| 9,786,483 | B2 | 10/2017 | Heeren et al. |
| 9,911,587 | B1 | 3/2018 | Li et al. |
| 9,911,588 | B1 | 3/2018 | Li |
| 9,922,812 | B2 | 3/2018 | Makarov |
| 9,972,480 | B2 | 5/2018 | Ristroph |
| 9,972,483 | B2 | 5/2018 | Makarov |
| 10,014,168 | B2 | 7/2018 | Zhang et al. |
| 10,020,174 | B2 | 7/2018 | Zhang et al. |
| 10,032,617 | B2 | 7/2018 | Welkie |
| 10,141,176 | B2 | 11/2018 | Stewart et al. |
| 10,145,792 | B2 | 12/2018 | Jungwirth et al. |
| 10,147,591 | B2 | 12/2018 | Derrick et al. |
| 10,186,409 | B2 | 1/2019 | Youngner |
| 10,229,823 | B2 | 3/2019 | Nishiguchi et al. |
| 10,242,854 | B2 | 3/2019 | Rusinov et al. |
| 10,276,361 | B2 | 4/2019 | Grinfeld et al. |
| 10,297,436 | B2 | 5/2019 | Tsybin et al. |
| 10,304,672 | B2 | 5/2019 | Fedosenko et al. |
| 10,340,052 | B2 | 7/2019 | Jungwirth et al. |
| 10,453,668 | B2 | 10/2019 | Continetti et al. |
| 10,510,524 | B2 | 12/2019 | Sekiya et al. |
| 10,580,633 | B2 | 3/2020 | Cooks et al. |
| 10,580,636 | B2 | 3/2020 | Chutjian et al. |
| 10,585,103 | B2 | 3/2020 | Jarrold et al. |
| 10,593,525 | B2 | 3/2020 | Hock et al. |
| 10,620,121 | B2 | 4/2020 | Zheng et al. |
| 10,622,203 | B2 | 4/2020 | Veryovkin et al. |
| 10,734,210 | B2 | 8/2020 | Stewart |
| 10,755,907 | B2 | 8/2020 | Aizikov et al. |
| 10,872,755 | B2 | 12/2020 | Christian |
| 10,903,061 | B2 | 1/2021 | Kholomeev et al. |
| 10,937,638 | B2 | 3/2021 | Cooks et al. |
| 10,984,999 | B2 | 4/2021 | Hsieh et al. |
| 11,024,491 | B2 | 6/2021 | Giannakopulos et al. |
| 11,069,516 | B2 | 7/2021 | Baba et al. |
| 11,075,067 | B2 | 7/2021 | Takahashi et al. |
| 11,107,670 | B2 | 8/2021 | Aliman et al. |
| 11,127,581 | B2 | 9/2021 | Cooks et al. |
| 11,131,655 | B2 | 9/2021 | Thoeing et al. |
| 11,145,503 | B2 | 10/2021 | Dziekonski |
| 11,152,198 | B2 | 10/2021 | Shaw |
| 11,177,122 | B2 | 11/2021 | Jarrold et al. |
| 11,367,602 | B2 | 6/2022 | Richardson et al. |
| 2002/0178923 | A1 | 12/2002 | Kishovich et al. |
| 2006/0012250 | A1* | 1/2006 | Ouvrier-Buffet ......... G01T 1/17 307/106 |
| 2007/0221862 | A1 | 9/2007 | Suits et al. |
| 2008/0191130 | A1 | 8/2008 | Bateman et al. |
| 2009/0076535 | A1 | 3/2009 | Agrawal et al. |
| 2010/0032561 | A1 | 2/2010 | Giles et al. |
| 2010/0059673 | A1 | 3/2010 | Makarov et al. |
| 2010/0176291 | A1 | 7/2010 | Hager et al. |
| 2010/0294924 | A1 | 11/2010 | Brouard et al. |
| 2012/0068068 | A1 | 3/2012 | Hill et al. |
| 2012/0112056 | A1 | 5/2012 | Brucker et al. |
| 2013/0270433 | A1 | 10/2013 | Ding et al. |
| 2013/0306855 | A1 | 11/2013 | Raptakis et al. |
| 2014/0061460 | A1 | 3/2014 | Hauschild et al. |
| 2015/0228469 | A1 | 8/2015 | Mizutani |
| 2015/0318161 | A1 | 11/2015 | Brown et al. |
| 2016/0018373 | A1 | 1/2016 | Pagé et al. |
| 2016/0035555 | A1 | 2/2016 | Hanson |
| 2016/0379814 | A1 | 12/2016 | Yamada et al. |
| 2017/0098534 | A1 | 4/2017 | Brown et al. |
| 2017/0365458 | A1 | 12/2017 | Collins et al. |
| 2018/0005809 | A1 | 1/2018 | Roukes et al. |
| 2018/0247805 | A1 | 8/2018 | Continetti et al. |
| 2018/0275097 | A1 | 9/2018 | Sandoghdar et al. |
| 2019/0066989 | A1 | 2/2019 | Cooks et al. |
| 2019/0164735 | A1 | 5/2019 | Yip et al. |
| 2020/0043716 | A1 | 2/2020 | Taniguchi |
| 2020/0075300 | A1 | 3/2020 | Bern |
| 2020/0161119 | A1 | 5/2020 | Richardson et al. |
| 2020/0249240 | A1 | 8/2020 | Jarrold et al. |
| 2020/0300630 | A1 | 9/2020 | Kozuma et al. |
| 2020/0357622 | A1 | 11/2020 | Arnold et al. |
| 2020/0357626 | A1 | 11/2020 | Jarrold et al. |
| 2021/0013022 | A1 | 1/2021 | Tateishi |
| 2021/0050200 | A1 | 2/2021 | Song et al. |
| 2021/0134573 | A1 | 5/2021 | Hager |
| 2021/0166831 | A1 | 6/2021 | Cao |
| 2021/0193447 | A1 | 6/2021 | Jarrold et al. |
| 2021/0202225 | A1 | 7/2021 | Jarrold et al. |
| 2021/0210331 | A1 | 7/2021 | Senko et al. |
| 2021/0210332 | A1 | 7/2021 | Jarrold et al. |

(56) References Cited

U.S. PATENT DOCUMENTS

| | | | |
|---|---|---|---|
| 2021/0210335 A1 | 7/2021 | Jarrold |
| 2021/0217606 A1 | 7/2021 | Jarrold et al. |
| 2021/0225625 A1 | 7/2021 | Cooks et al. |
| 2021/0262915 A1 | 8/2021 | Stevens et al. |
| 2021/0272790 A1 | 9/2021 | Stewart et al. |
| 2021/0287892 A1 | 9/2021 | Lehmann |
| 2021/0287897 A1 | 9/2021 | Lange |
| 2021/0327605 A1 | 10/2021 | Shen et al. |
| 2021/0335592 A1 | 10/2021 | Cooks et al. |
| 2021/0343518 A1 | 11/2021 | Pophristic |

FOREIGN PATENT DOCUMENTS

| | | | |
|---|---|---|---|
| CN | 102169791 | A | 8/2011 |
| CN | 102648511 | A | 8/2012 |
| CN | 103548111 | A | 1/2014 |
| CN | 103745905 | A | 4/2014 |
| CN | 104766780 | A | 7/2015 |
| DE | 19605100 | A1 | 8/1996 |
| EP | 1665326 | B1 | 4/2010 |
| EP | 1665328 | B1 | 6/2012 |
| EP | 1549914 | B1 | 12/2012 |
| EP | 2665084 | A2 | 11/2013 |
| EP | 2884520 | B1 | 2/2018 |
| EP | 3340276 | A1 | 6/2018 |
| EP | 2951851 | B1 | 10/2019 |
| EP | 2856139 | B1 | 1/2020 |
| EP | 3505489 | B1 | 3/2020 |
| EP | 3289603 | B1 | 12/2020 |
| EP | 3884510 | A1 | 9/2021 |
| EP | 3891777 | A1 | 10/2021 |
| EP | 3895202 | A1 | 10/2021 |
| EP | 3895203 | A1 | 10/2021 |
| EP | 3440691 | B1 | 11/2021 |
| FR | 3010527 | A1 | 3/2015 |
| GB | 2434249 | A | 7/2007 |
| GB | 2470133 | A | 11/2010 |
| GB | 2598591 | A | 3/2022 |
| JP | 2015170445 | A | 9/2015 |
| WO | 199931707 | A1 | 6/1999 |
| WO | 2002103747 | A1 | 12/2002 |
| WO | 2003098190 | A2 | 11/2003 |
| WO | 2005041244 | A2 | 5/2005 |
| WO | 2008071967 | A2 | 6/2008 |
| WO | 2009076535 | A1 | 6/2009 |
| WO | 2011086430 | A1 | 7/2011 |
| WO | 2012083031 | A1 | 6/2012 |
| WO | 2012092457 | A1 | 7/2012 |
| WO | 2013143349 | A1 | 10/2013 |
| WO | 2014183105 | A1 | 11/2014 |
| WO | 2015097462 | A1 | 7/2015 |
| WO | 2016073850 | A1 | 5/2016 |
| WO | 2017089991 | A1 | 6/2017 |
| WO | 2017190031 | A1 | 11/2017 |
| WO | 2017196863 | A1 | 11/2017 |
| WO | 2017214037 | A1 | 12/2017 |
| WO | 2018011591 | A1 | 1/2018 |
| WO | 2018109920 | A1 | 6/2018 |
| WO | 2018124861 | A2 | 7/2018 |
| WO | 2019016571 | A1 | 1/2019 |
| WO | 2019060538 | A1 | 3/2019 |
| WO | 2019140233 | A1 | 7/2019 |
| WO | 2019162687 | A1 | 8/2019 |
| WO | 2019202338 | A1 | 10/2019 |
| WO | 2019231854 | A1 | 12/2019 |
| WO | 2019236139 | A1 | 12/2019 |
| WO | 2019236140 | A1 | 12/2019 |
| WO | 2019236141 | A1 | 12/2019 |
| WO | 2019236142 | A1 | 12/2019 |
| WO | 2019236143 | A1 | 12/2019 |
| WO | 2019236572 | A1 | 12/2019 |
| WO | 2019236574 | A1 | 12/2019 |
| WO | 2019243083 | A1 | 12/2019 |
| WO | 2020049165 | A1 | 3/2020 |
| WO | 2020106310 | A1 | 5/2020 |
| WO | 2020117292 | A1 | 6/2020 |
| WO | 2020121166 | A1 | 6/2020 |
| WO | 2020121167 | A1 | 6/2020 |
| WO | 2020157654 | A1 | 8/2020 |
| WO | 2020157655 | A1 | 8/2020 |
| WO | 2020157656 | A1 | 8/2020 |
| WO | 2020198124 | A1 | 10/2020 |
| WO | 2020198332 | A1 | 10/2020 |
| WO | 2020219527 | A1 | 10/2020 |
| WO | 2020219605 | A1 | 10/2020 |
| WO | 2021006811 | A1 | 1/2021 |
| WO | 2021061650 | A1 | 4/2021 |
| WO | 2021072186 | A1 | 4/2021 |
| WO | 2021084339 | A1 | 5/2021 |
| WO | 2021126971 | A1 | 6/2021 |
| WO | 2021126972 | A1 | 6/2021 |
| WO | 2021144737 | A1 | 7/2021 |
| WO | 2021158603 | A1 | 8/2021 |
| WO | 2021158676 | A1 | 8/2021 |
| WO | 2023111538 | A1 | 6/2023 |

OTHER PUBLICATIONS

Latimer, P., "Light Scattering vs. Microscopy for Measuring Average Cell Size and Shape", Biophys. J., 27:117-126 (1979).

LCMS-9030—Quadrupole Time-of-Flight Liquid Chromatograph Mass Spectrometer, Shimadzu Scientific Instruments (2011).

Lee, S.F., and Klenerman, D., "Weighing one protein with light", Science 360(6387):378-379 (2018).

Liebel, M., et al., "Ultrasensitive Label-Free Nanosensing and High-Speed Tracking of Single Proteins", Nano Letters 17:1277-1281 (2017).

Lin, Y-H., et al., "Shot-noise limited localization of single 20 nm gold particles with nanometer spatial precision within microseconds", Optics Express 22(8), (2014).

Lutomski, C., et al., "Resolving Subpopulations in High and Low-density Lipoproteins", Dept. of Chem, Indiana University, PowerPoint ASMS (2018).

Lutomski, C.A., et al., "Multiple Pathways in Capsid Assembly", JACS 140(17):5784-5790 (2018).

Lutomski, C.A., et al., "Resolution of Lipoprotein Subclasses by Charge Detection Mass Spectrometry", Analytical Chemistry 90(11):6353-6356 (2018).

Mabbett, S.R., et al., "Pulsed Acceleration Charge Detection Mass Spectrometry: Application to Weighing Electrosprayed Droplets", Anal. Chem., 79:8431-8439 (2007).

Makarov, A., et al., "Performance Evaluation of a Hybrid Linear Ion Trap/Orbitrap Mass Spectrometer", Anal. Chem. 78:2113-2120 (2006).

Maze, J.T., "Charge Detection Mass Spectrometry", pp. 387-401 Dissertation for Indiana University. (2205).

Moemer, W.E., and Fromm, D.P., "Methods of single-molecule fluorescence spectroscopy and microscopy", Review of Scientific Instruments 74(8):3597-3619 (2003).

Morikis, D., and Lambris, J.D., "Physical methods for structure, dynamics and binding in immunological research", Trends in Immunology 25(12): 700-707 (2004).

Morris, J.D., and Payne, C.K., "Microscopy and Cell Biology: New Methods and New Questions", Annual Review of Physical Chemistry 70:199-218 (2019).

Nie, Z., et al., "Microscopy-Based Mass Measurement of a Single Whole Virus in a Cylindrical Ion Trap", Angewandte Chemie 45:8131-8134 (2006).

Pansieri, J., et al., "Mass and charge distributions of amyloid fibers involved in neurodegenerative diseases: mapping heterogeneity and polymorphism", Chemical Science 9:2791-6 (2018).

Park, J-S., et al., "Label-free and live cell imaging by interferometric scattering microscopy", Chemical Science 9:2690-7 (2018).

Patil, A.A., et al., "High Mass Ion Detection with Charge Detector Coupled to Rectilinear Ion Trap Mass Spectrometer", J. Am. Soc. Mass Spectrom., 28:1066-1078 (2017).

Peng, W-P., et al., "Optical Detection Methods for Mass Spectrometry of Macroions", Mass Spectrometry Reviews 23:443-465 (2004).

(56) References Cited

OTHER PUBLICATIONS

Pierson, E. E., et al., "Resolving Adeno-Associated Viral Particle Diversity With Charge Detection Mass Spectrometry", Analytical Chemistry 88:6718-6725 (2016).
Pierson, E., E., et al., "Charge Detection Mass Spectrometry for Single Ions with an Uncertainty in the Charge Measurement of 0.65 e", J. Am. Soc. Spectrom 26:1213-1220 (2015).
Pierson, E.E., et al., "Detection of Late Intermediates in Virus Capsid Assembly by Charge Detection Mass Spectrometry", JACS 136:3536-3541 (2014).
Pierson, E.E., et al., "Detection of Late Intermediates in Virus Capsid Assembly by Charge Detection Mass Spectrometry", Supplementary Figures S1-S7 (2014).
Pierson, Elizabeth E., "Charge Detection Mass Spectrometry: Instrumentation & Applications to Viruses", Dissertation to Indiana University Department of Chemistry (2015).
Piliarik, M., and Sandoghdar, V., "Direct optical sensing of single unlabelled proteins and super-resolution imaging of their binding sites", Nature Communications 5:4495 (2014).
Räcke, P., et al., "Detection of small bunches of ions using image charges", Scientific Reports 8:9781 (2018).
Schmidt, H., et al., "Conetrap: A compact electrostatic ion trap", Nuclear Instruments and Methods in Physics Research B 173:523-527 (2001).
Shelton, H., et al., "Electrostatic Acceleration of Microparticles to Hypervelocities", Journal of Applied Physics 31(7):1243-6 (1960).
Sipe, D.M., et al., "Characterization of Mega-Dalton-Sized Naoparticles by Superconducting Tunnel Juncion Cryodetection Mass Spectrometry", ACS Nano 12: 2591-2602 (2018).
Smith, J.W., et al., "Image Charge Detection Mass Spectrometry: Pushing the Envelope with Sensitivity and Accuracy", Analytical Chemistry 83(3):950-6 (2011).
Smith, Johnathan, "Charge Detection Mass Spectrometry: Pushing the Limits from Teradaltons to Kilodaltons", Dissertation to Indiana University Department of Chemistry (2011).
Snijder, J., et al., "Defining the Stoichiometry and Cargo Load of Viral and Bacterial Nanoparticles by Orbitrap Mass Spectrometry", JACS 136:7295-7299 (2014).
Sugai, T., "Mass and Charge Measurements on Heavy Ions", Mass Spectrometry 6:S0074 (2017).
Thomas, J.J., et al., "Electrospray ion mobility spectrometry of intact viruses", Spectroscopy 18:31-36 (2004).
Turkowyd, B., et al., "From single molecules to life: microscopy at the nanoscale", Anal Bioanal Chem 408:6885-6911 (2016).
Van de Waterbeemd, M., et al., "High-fidelity mass analysis unveils heterogeneity in intact ribosomal particles", Nature Methods [online] doi: 10.1038/nmeth.4147 (2017).
Verschueren, H., "Interference Reflection Microscopy in Cell Biology: Methodology and Applications", J. Cell Sci. 75:279-301 (1985).
Walt, D.R., "Optical Methods for Single Molecule Detection and Analysis", Analytical Chemistry 85:1258-1263 (2013).
Wang, W., and Tao, N., "Detection, Counting, and Imaging of Single Nanoparticles", Analytical Chemistry 86:2-14 (2014).
Yavor, M.I., et al., "Ion-optical design of a high-performance multiple-reflection time-of-flight mass spectrometer and isobar separator", International Journal of Mass Spectrometry 381-382:1-9 (2015).
Young, G., and Kukura, P., "Interferometric Scattering Microscopy" Annual Review of Physical Chemistry, 70:301-22 (2019).
Young, G., et al., "Quantitative mass imaging of single biological macromolecules", Biophysics 360:423-427 (2018).
Zilch, Lloyd W., "Image Charge Detection and Image Charge Detection Mass Spectrometry", Dissertation to Indiana University Analytical Department of the Department of Chemistry (2008).
Schlottmann, F., et al., "A Simple Printed Circuit Board-Based Ion Funnel for Focusing Low m/z Ratio Ions with high kinetic Energies at Elevated Pressure", J. Am. Soc. Mass Spectrom 30:1813-1823 (2019).
Keifer, D.Z., et al., "Acquiring Structural Information on Virus Particles with Charge Detection Mass Sprectrometry" J. Am. Soc. Mass Spectrom. 27:1026-1036 (2016).
Pierson, E.E., et al., "Charge Detection Mass Spectrometry Identifies Preferred Non-Icosahedral Polymorphs in the Self-Assembly of Woodchuck Hepatitis Virus Capsids", J. Mol Biol 428:292-300 (2016).
Elliott, A.G., et al., "Effects of Individual Ion Energies on Charge Measurements in Fourier Transform Charge Detection Mass Spectrometry (FT-CDMS)", J. Am. Soc. Mass Spectrom. 30:946-955 (2018).
Julian, R.R., et al., "Ion Funnels for the Masses: Experiments and Simulations with a Simplified Ion Funnel", J. Am. Soc. Mass Spectrom. 16:1708-1712 (2005).
Patil, A.A., et al., "Linear and Nonlinear Resonance Ejection of High Mass Ions with charge detection rectilinear ion trap mass spectrometer", Journal Pre-proof International Journal of Mass Spectrometry 450:116301 (2020).
Elliott, A.G., et al., "Simultaneous Measurements of Mass and Collisional Cross-Section of Single Ions with Charge Detection Mass Spectrometry", Analytical Chem 89:7701-7708 (2017).
Shinholt, Deven Lee, "Charge Detection Mass Spectrometry and a Frequency Scanned linear Quadrupole: Mass Analysis of Large Ions", Doctor of Philosophy Thesis submitted to Indiana University Department of Chemistry, Dec. 2014.
Karampini, E., "The Use of Bayesian Statistics in Mass Spectrometry Data—Literature research", Jan. 1, 2015, Retrieved from the Internet: URL:https://esc.fnwi.uva.nl/thesis/centraal/files/f1299028219.pdf retrieved on Jul. 26, 2019].
International Search Report and Written Opinion for International Application No. PCT/GB2019/050494, mailed on Aug. 2, 2019.
International Search Report and Written Opinion for International application No. PCT/US2021/026383 mailed on Sep. 10, 2021.
International Preliminary Report on Patentability for PCT/US2021/026383, mailed Oct. 6, 2022.
International Search Report and Written Opinion for International Patent Application No. PCT/GB2021/053426, mailed Apr. 12, 2022.
Smith, D. P., et al., "Deciphering Drift Time Measurements from Travelling Wave Ion Mobility Spectrometry-Mass Spectrometry Studies", Eur. J. Mass Spectrom., 15(2):113-130, Apr. 1, 2009.
Ashcroft, A. E., "Mass spectrometry-based studies of virus assembly", Current Opinion in Virology, 36:17-24, Jun. 1, 2019.
Lu, J., et al., "Improved Peak Detection and Deconvolution of Native Electrospray Mass Spectra from Large Protein Complexes", J. Am. Soc. Mass Spectrom., 26(12):2141-2151, Sep. 1, 2015.
Combined Search and Examination Report for United Kingdom Patent Application No. GB2118935.2, mailed Jun. 13, 2022.
Pierson, E. E., et al., "Resolving Adeno-Associated Viral Particle Diversity With Charge Detection Mass Spectrometry", Anal Chem., 88(13): 6718-6725, Jul. 5, 2017.
International Search Report and Written Opinion for International Patent Application No. PCT/GB2021/053427, mailed Apr. 5, 2022.
Search Report for United Kingdom Patent Application No. GB2107491.9, mailed Mar. 10, 2022.
Combined Search and Examination Report for United Kingdom Patent Application No. GB2118929.5, mailed Jun. 16, 2022.
Contino, N. C., et al., "Charge detection mass spectrometry for single ions with a limit of detection of 30 charges", International Journal of Mass Spectrometry, vol. 345-347, p. 153-159, (2013).
Greenwood, J.B., et al., "A comb-sampling method for enhanced mass analysis in linear electrostatic ion traps", Rev. Sci. Instrum., 82:043103-12, (2011).
Azzellino, G., et al., "Resonant noise-canceling current front-end for high-resolution impedance sensing", IEEE International Instrumentation and Measurement Technology Conference (I2MTC), pp. 1-6, (2018).
Lohse, S., et al., "Quartz resonators for penning traps toward mass spectrometry on the heaviest ions", Rev. Sci. Instrum. 91:093202-8, (2020).
Lohse, S., et al., "A quartz amplifier for high-sensitivity Fourier-transform ion-cyclotron-resonance measurements with trapped ions", Rev. Sci. Instrum., 90:063202-6, (2019).

(56) References Cited

OTHER PUBLICATIONS

Gustafson, E.L., et al., Accurately Mapping Image Charge and Calibrating Ion Velocity in Charge Detection Mass Spectrometry', J. Am. Soc. Mass Spectrom, 31:2161-2170, (2020).
Kenny, DJ et al., "Scanwave: A New Approach to Enhancing Spectral Data on a Tandem Quadrupole Mass Spectrometer", Journal of the American Society for Mass Spectrometry, 21(6):1061-1069, (210).
Combined Search and Examination Report for United Kingdom Patent Application No. GB2218465.9, mailed Jun. 2, 2023.
Keifer, Z. D., et al., "Charge detection mass spectrometry: weighing heavier things", Analyst, 142(10):1654-1671, Apr. 26, 2017.
Heck, M., et al., "An online FT-ICR Penning-trap mass spectrometer for the DPS2-F section of the Katrin experiment", Nuclear Instruments & Methods in Physics Research. Section A, 757:54-61, Sep. 1, 2014.
Invitation to Pay Additional Fees and Where Applicable Protest Fee for International Patent Application No. PCT/IB2022/060398, mailed Feb. 13, 2023.
International Search Report and Written Opinion for International Patent Application No. PCT/GB2023/050073, mailed Apr. 18, 2023.
Hogan, J., et al., "Optimized Electrostatic Linear Ion Trap for Charge Detection Mass Spectrometry", Journal of the American Society for Mass Spectrometry, Elsevier Science Inc, 29(10):2086-2095, Jul. 9, 2018.
Todd, A.R. and Jarrold, M.F., "Dramatic Improvement in Sensitivity with Pulsed Mode Charge Detection Mass Spectrometry", Analytical Chemistry, 91(21):14002-14008, (2019).
Search Report for United Kingdom Paten Application No. GB2211029.0, mailed Jan. 27, 2023.
Search Report for United Kingdom Patent Application No. GB2300648.9, mailed Jul. 7, 2023.
Search Report for United Kingdom Patent Application No. GB2211029.0, mailed Jul. 27, 2023.
Arroyo, J.O., et al., "Interferometric scattering microscopy and its combination with single-molecule fluorescence imaging", Nature Protocols, 11(4):617-633 (2016).
Austin, D.E., "Impact-Ionization Mass Spectrometry of Cosmic Dust", Dissertation California Institute of Technology (2003).
Barney, B.L., "A multi-stage image charge detector made from printed circuit boards", Review of Scientific Instruments 84:114101-1 through 114101-6 (2013).
Benner, W.H., "A Gated Electrostatic Ion Trap To Repetitiously Measure the Charge and m/z of Large Electrospray Ions", Anal. Chem 69:4162-4268 (1997).
Botamanenko, D.Y., et al., "Ion-Ion Interactions in Charge Detection Mass Spectrometry", J. Am. Soc. Mass Spectrom, [online] Nov. 1, 2019, DOI: 10.101007/s13361-019-02343-y.
Brown, B.A., et al., "Charge Detection Mass Spectrometry Measurements of Exosomes and other Extracellular Particles Enriched from Bovine Milk", Analytical Chemistry Just Accepted Manuscript DOI: 10.1021/acs.analchem.9b05173 Jan. 28, 2020.
Brunner, T., et al., "An RF-only ion-funnel for extraction from high-pressure gases", International Journal of Mass Spectrometry 379:110-120 (2015).
Cole, D., et al., "Label-Free Single-Molecule Imaging with Numerical-Aperture-Shaped Interferometric Scattering Microscopy", ACS Photonics 4:211-216 (2017).
Contino, N.C., "Ion Trap Charge Detection Mass Spectrometry: Lowering Limits of Detection and Improving Signal to Noise", Dissertation for Doctor of Philosophy at Indiana University (2013).
Contino, N.C., and Jarrold, M.F., "Charge detection mass spectrometry for single ions with a limit of detection of 30 charges", International Journal of Mass Spectrometry 345-347:153-159 (2013).
Contino, N.C., et al., "Charge Detection Mass Spectrometry with Resolved Charge States", J. Am. Soc. Mass Spectrom 24:101-108 (2013).
Curtis, A.S.G., "The Mechanism of Adhesion of Cells to Glass: A Study by Interference Reflection Microscopy", Journal of Cell Biology 20:199-215 (1964).
Dahan, M., et al., "A new type of electrostatic ion trap for storage fo fast ion beams", Rev. Sci. Instrum. 69(1):76-83 (1998).
Dania, Lorenzo "Investigation on a two-frequency Paul trap for a cavity optomechanics system", Master Thesis Universitá Degli Studi Di Pisa (2016).
Elliott, A.G., et al., "Simultaneous Measurements of Mass and Collisional Cross-Section of Single Ions with Charge Detection Mass Spectrometry", Analytical Chemistry 89:7701-7708 (2017).
Doussineau, T., et al., "Charge Detection Mass Spectrometry for the Characterization of Mass and Surface Area of Composite Nanoparticles", Journal of Physical Chemistry C 119:10844-10849 (2015).
Doussineau, T., et al., "Mass spectrometry investigations of nanoparticles by tandem charge detection mass spectrometry", SpectroscopyEurope 24(4) 3 pages (2012).
Doussineau, T., et al., "Charging megadalton poly(ethylene oxide)s by electrospray ionization. A charge detection mass spectrometry study", Rapid Communications in Mass Spectrometry 25:617-623 (2011).
Doussineau, T., et al., "Direct Molar Mass Determination of Self-Assembled Amphiphilic Block Copolymer Nanoobjects Using Electrospray-Charge Detection Mass Spectrometry", ACS Macro Lett 1:414-417 (2012).
Doussineau, T., et al., "Infrared multiphoton dissociation tandem charge detection-mass spectrometry of single megadalton electrosprayed ions", Review of Scientific Instruments 82:084104-1 through -8 (2011).
Doussineau, T., et al., "Pushing the Limit of Infrared Multiphoton Dissociation to Megadalton-Size DNA Ions", The Journal of Physical Chemistry Letters 3:2141-2145 (2012).
Draper, B.E., and Jarrold, M.F., "Real-Time Analysis and Signal Optimization for charge Detection Mass Spectrometry", J. Am. Soc., Mass Spectrom. 30:898-904 (2019).
Draper, B.E., et al., "The Funpet—a New Hybrid Ion Funnel-Ion Carpet Atmospheric Pressure Interface for the Simultaneous Transmission of a Broad Mass Range", J. Am. Soc. Mass Spectrom Electronic Supplmentary Material [online]. Retrieved from Internet URL: (https://doi.org/10.1007/s13361-018-2038-3), (2018).
Dunbar, C.A., et al., "Probing Antibody Binding to Canine Parvovirus with Charge Detection Mass Spectrometry", Journal of the American Chemical Society 140:15701-15711 (2018).
Dziekonski, E.T., et al., "Determination of Collision Cross Sections Using a Fourier Transform Electrostatic Linear Ion Trap Mass Spectrometer", J. Am. Soc. Mass Spectrom. 29:242-250 (2018).
Dziekonski, E.T., et al., "Fourier-Transform MS and Closed-Path Multireflection Time-of-Flight MS Using an Electrostatic Linear Ion Trap", Analytical Chemistry 89:10965-10972 (2017).
Elliot, A.G., et al., "Mass, mobility and MSn measurements of single ions using charge detection mass spectrometry", Analyst 142:2760-2759 (2017).
Elliott, A.G., et al., "Single Particle Analyzer of Mass: A Charge Detection Mass Spectrometer with a Multi-Detector Electrostatic Ion Trap", International Journal of Mass Spectrometry, 414:45-55 (2017).
Esser, T., "A Cryogenic Mass Spectrometer for Action Spectroscopy of Single Nanoparticles", Dissertation Universität Leipzig, Jan. 21, 2019.
Esser, T.K., et al., "A cryogenic single nanoparticle action spectrometer", Review of Scientific Instruments, 90:125110 (1990).
Esser, T.K., et al., "A Cryogenic Single Nanoparticle Action Spectrometer" Supplementary Material, Dec. 2019.
Fuerstenau, S.D., et al., "Mass Spectrometry of an Intact Virus" Angew. Chem Int. Ed. 40(3):541-544 (2001).
Gamero-Castaño, M., "Induction charge detector with multiple sensing stages", Review of Scientific Instruments 78:043301-7 (2007).
Goldfain, A.M., et al., "Dynamic Measurements of the Position, Orientation, and DNA Content of Individual Unlabeled Bacteriophages", Journal of Physical Chemistry B, 120:6130-6138 (2016).
Halim, M.A., et al., "Infrared Laser Dissociation of Single Megadalton Polymer Ions in a Gated Electrostatic Ion Trap. The Added Value of Statistical Analysis of Individual Events" Electronic Supplementary material (ESI) for Physical Chemistry Chemical Physics (2018).

(56) References Cited

OTHER PUBLICATIONS

Han, K.Y., and Ha, T., "Measuring molecular mass with light", Nature Photonics 12:378-385 (2018).
Hao, Z., et al., "Intact Antibody Characterization Using Orbitrap Mass Spectrometry", Chapter 10 in State-of-the-Art and Emerging Technologies for Therapeutic Monoclonal Antibody Characterization vol. 3. Defining the Next Generation of Analytical and Biophysical Techniques, DOI: 10.1021/bk-2015-1202, (2015).
Harper, C.C., et al., "Multiplexed Charge Detection Mass Spectrometry for High-Throughput Single Ion Analysis of Large Molecules", Analytical Chemistry 91:7458-7465 (2019).
Hogan, J.A., and Jarrold, M.F., "Optimized Electrostatic Linear Ion Trap for Charge Detection Mass Spectrometry", American Society for Mass Spectrometry DOI: 10.1007/s13361-018-2007-x (2018).
Hogan, Joanna Arielle, "Improving Charge Detection Mass Spectrometry Instrumentation for the Analysis of Heterogeneous, Multi-Megadalton Ions", Doctor of Philosophy Indiana University (2018).
Holmes, K., et al., "Assembly pathway of hepatitis B core virus-like particles from genetically fused dimers", JBC Papers in Press Manuscript M114.622035 (2015).
Howder, C.R., et al., "Optically detected, single nanoparticle mass spectrometer with pre-filtered electrospray nanoparticle source", Review of Scientific Instruments 85:014104-1 through -6 (2014).
Jarrold, M.F., "Helices and Sheets in vacuo" Physical Chemistry Chemical Physics 9:1659-1671 (2007).
Kaplan, P.D., et al.,, "Light-scattering microscope", Applied Optics 38(19):4151-4257 (1999).
Keifer, D.Z., "Charge detection mass spectrometry: weighing heavier things", Analyst 142:1654-1671 (2017).
Keifer, D.Z., and Jarrold, M.F., "Single-Molecule Mass Spectrometry", Mass Spectrometry Reviews DOI 10.1002/mas (2016).
Keifer, D.Z., et al., "Charge Detection Mass Spectrometry with Almost Perfect Charge Accuracy", Analytical Chemistry 87:10330-10337 (2015).
Keifer, D.Z., et al., "Measurement of the accurate mass of a 50 MDa infections virus", Rapid Communications in Mass Spectrometry 30:1957-1962 (2016).
Keifer, D.Z., et al., "Spontaneous Mass and Charge Losses from Single Multi-Megadalton Ions Studied by Charge Detection Mass Spectrometry", J. Am. Soc. Mass Spectrom. DOI: 10.1007/s13361-016-1582-y (2017).
Kondylis, P., et al., "Analytical Techniques to characterize the Structure, Properties, and Assembly of Virus Capsids", Analytical Chemistry 91:622-636 (2019).
Examination Report for United Kingdom Patent Application No. GB2418348.5, mailed Jun. 6, 2025.

* cited by examiner

INDUCTIVE DETECTOR WITH INTEGRATED AMPLIFIER

CROSS-REFERENCE TO RELATED APPLICATIONS

This application claims priority to and benefit of U.S. Provisional Patent Application No. 63/289,951, filed Dec. 15, 2021. The entire disclosure of which is hereby incorporated by reference.

TECHNICAL FIELD

The present disclosure relates generally to the field of inductive detectors, and more particularly to an inductive detector comprising an integrated amplifier.

BACKGROUND

An ion or charged particle passing through a conductive cylinder produces an image charge on the tube by electrostatic induction. The voltage on the tube is proportional to the charge on the particle but inversely proportional to the capacity of the system. This voltage can be amplified, digitized, and analyzed such that modern detection systems can detect tens to hundreds of elementary charges in a single pass.

The noise in these systems limits the amplitude of the signal that can be observed—or more specifically the signal-to-noise ratio limits the signal that can be observed.

Numerous approaches exist for improving the noise characteristics of these systems. Ions can be repetitiously measured using multi-electrode devices or by using electrostatic ion traps in what is essentially a signal averaging approach utilizing fast Fourier transforms or correlation analysis. Background noise can also be reduced by cooling the detection electronics. Careful trap design considerations can reduce the capacitance of the pickup tube, which improves the voltage observed, produced per charge.

The pickup tube must be physically connected to the input stage of the amplifier. Several approaches have been implemented including the use of conductive rods and thin wires. Prior art arrangements have placed a JFET (junction-gate field-effect transistor) and feedback components inside a metal tube supporting the trap body; utilized an electrostatic ion trap where the amplifier is also placed outside the body of the trap; or designs utilizing printed circuit boards have used secondary connections in the form of wires to interface with amplifier electronics. In all of these implementations, the pickup tube (or electrode) exists as a component independent of the detector circuit. Moreover, the pickup tube is placed inside its own shielded housing through which a secondary conductor must be passed. Such a conventional approach is convenient but suffers drawbacks.

The present invention arose in a bid to address some of the shortcomings of the prior art, in particular in a bid to minimize stray capacitance and parasitics, as experienced with the prior art.

SUMMARY

According to a first aspect, there is provided an image charge detection assembly for a mass spectrometer comprising an image charge detector, which is housed within an electrically conductive shielding enclosure, and a preamplifier, which is electrically connected to the detector and housed with the detector within the enclosure.

By such an arrangement, additional conductors, which would be required to make a connection from the detector to the amplifier input, are eliminated.

According to a further aspect, there is provided an image charge detector for a mass spectrometer comprising a preamplifier directly fabricated onto the charge detector.

According to a yet further aspect, there is provided an image charge detector for a mass spectrometer comprising an input stage of a preamplifier directly coupled to the charge detector.

These and other aspects and features of the present disclosure will be more readily understood when read in conjunction with the accompanying drawings. Moreover, it must be noted that the various features of any of the above statements may be combined without restriction, as will be readily appreciated by those skilled in the art.

DETAILED DESCRIPTION

Figure 1:
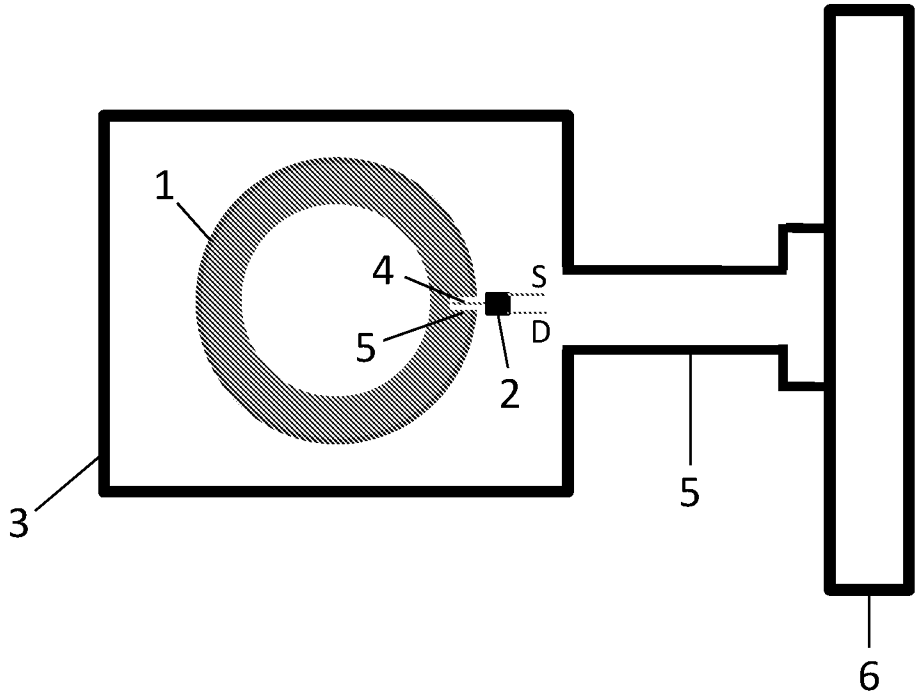
FIG. 1 is schematic sectional view of an image charge detection assembly according to a first embodiment.

With reference to FIG. 1, there is shown an image charge detection assembly for a mass spectrometer comprising an image charge detector 1 and a preamplifier 2. The preamplifier 2 is electrically connected to the image charge detector 1. The image charge detector 1 and the preamplifier 2 are housed together within an electrically conductive shielding enclosure 3.

The enclosure 3 is not particularly limited in form. It may take any suitable form that provides suitable electrical shielding, as will be readily appreciated by those skilled in the art. The enclosure will be provided within a vacuum chamber (not shown). It preferably provides support to the image charge detector 1.

By the unique placement of the preamplifier 2 within the same shielded enclosure 3 as the image charge detector 1, the requirement for additional conductors (for making a connection from the image charge detector 1 to the amplifier input) is eliminated.

In the present arrangement, the image charge detector 1 comprises a cylindrical pickup tube. It must be noted, however, that it may alternatively comprise an Orbitrap, a Fourier Transform Ion Cyclotron Resonance (FTICR) detection cell, a printed circuit board electrode (as discussed below with reference to FIG. 3), or otherwise.

The preamplifier 2 may comprise a single integrated circuit, a circuit board comprising a plurality of discrete components, a hybrid integrated circuit, or otherwise.

The image charge detector 1 is preferably directly connected to the input stage(s) of the preamplifier 2. The direct connection may be accomplished, for example, by directly fabricating a junction-gate field-effect transistor (JFET), or other suitable high-impedance pre-amplifier, onto a body of the image charge detector 1, or by directly coupling the gate of the JFET (or input stage of an alternatively configured pre-amplifier) to the image charge detector 1. The direct coupling of the input stage may be by soldering.

In the arrangement of FIG. 1, the preamplifier comprises a JFET, which has its gate directly connected to a body of the image charge detector 1, which, as discussed, comprises a cylindrical pickup tube.

The image charge detector 1, whatever its form, is preferably provided with a recess 5 in an outer surface thereof, as shown. In this case, the JFET gate may be directly soldered to the image charge detector in the recess 5. Alternative structures will be possible, as will be readily appreciated by those skilled in the art.

The JFET, or any alternative high-impedance pre-amplifier implemented, can also be directly integrated onto the pickup tube, or alternatively structured image charge device 1, by selecting a suitable electrically insulating, thermally conductive, substrate, such as a sputtered aluminum nitride film. This substrate may first be deposited on the outer surface of the electrically conductive tube when fabricating the JFET onto the outer surface of the pickup tube.

Returning to the structure of FIG. 1, the enclosure 3 is attached to a mounting (vacuum) flange 6 via a support tube 5.

Figure 2:
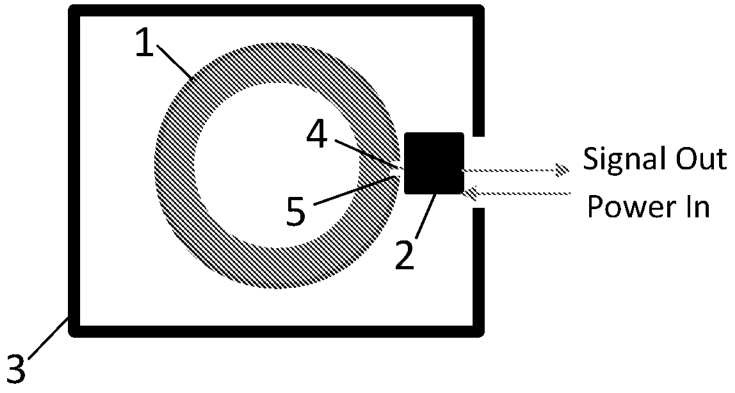
FIG. 2 shows a schematic partial sectional view of an image charge detection assembly according to a second embodiment.

With reference to FIG. 2, there is shown an alternative arrangement to that of FIG. 1. The mounting flange and support tube are omitted from FIG. 2. In this arrangement (although it again need not be limited as such), the image charge detector also comprises a cylindrical pickup tube. A PCB mounting pin of a PCB mounted pre-amplifier is directly soldered to the image charge detector 1 in the recess 5. As will be readily appreciated by those skilled in the art, particularly in light of the discussion herein, this represents one only of a number of possible alternative arrangements.

Figure 3:
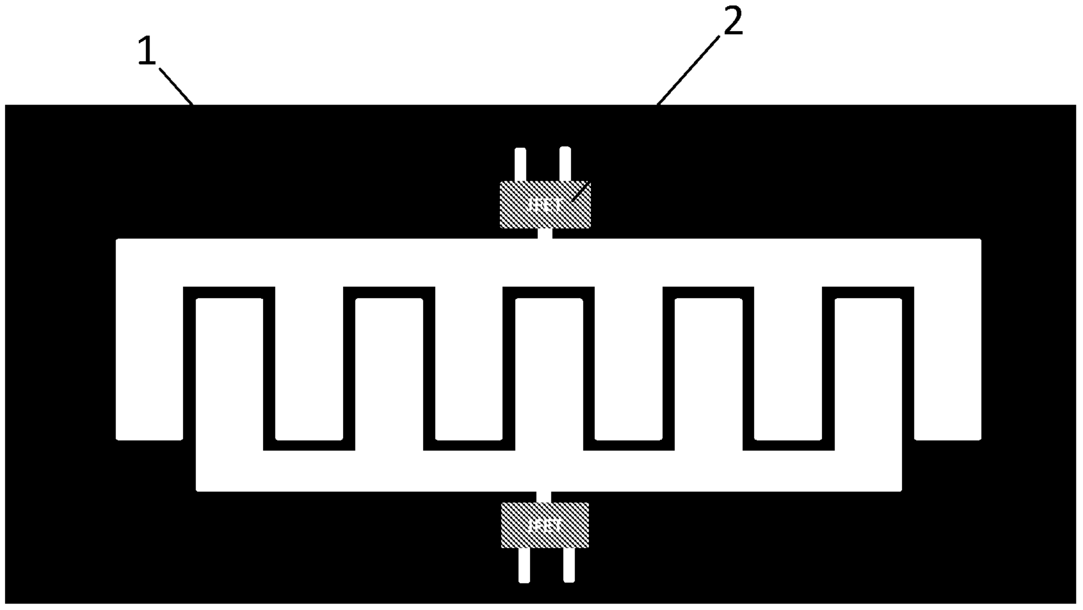
FIG. 3 shows a PCB electrode layout of an image charge detector according to an embodiment.

With reference now to FIG. 3, an alternative form of image charge detector 1 is shown, which may, as with the cylindrical pickup tubes of the arrangements of FIGS. 1 and 2, be located in the enclosure of an image charge detection assembly.

The image charge detector 1 comprises a PCB patterned with electrodes. The electrodes consist of alternating regions that are connected to one of two pre-amplifiers in an alternating fashion. As will be appreciated by those skilled in the art, the electrode configuration may be varied from that shown. The depicted arrangement comprises a 11-stage detector using a single PCB. Alternative arrangements will be possible with more or less stages and/or utilizing a plurality of shapes and/or more or less PCBs. There may, for example, be two PCBs placed in a sandwich arrangement with a space in between.

The image charge detector 1 is again directly connected to the input stage(s) of the preamplifiers 2. Here the pre-amplifiers are shown to comprise JFETs, which has its gate connected to the electrodes. The pre-amplifiers may be otherwise configured. It is preferable that the pre-amplifiers and any supporting electronics are mounted directly on the PCB.

Any implementation discussed herein will be configured, by appropriate selection of materials, to deal with thermal control and outgassing. Vacuum is an excellent thermal insulator. Hence, temperature control of semiconductor devices in a vacuum system can be challenging because the heat these devices may generate is not easily dissipated by conductive pathways. Additionally, the performance characteristics of semiconductor devices often have a strong temperature dependence. Many common printed circuit board materials generate significant outgassing. Thus in order to improve overall performance, it is preferable that these semiconductor components are assembled on ceramic (e.g. aluminum nitride) printed circuit boards or aluminum base printed circuit boards such as are sold by Hitech Circuits Co., Limited (https://hitechcircuits.com/) or AdTech Ceramics (http://www.adtechceramics.com/).

Therefore, the disclosed arrangements are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Although various example embodiments have been disclosed, a worker of ordinary skill in this art would recognize that certain modifications would come within the scope of this disclosure. For that reason, the following claims should be studied to determine the scope and content of this disclosure.

The invention claimed is:

1. An image charge detection assembly for a mass spectrometer comprising an image charge detector, which is housed within an electrically conductive shielding enclosure, and a preamplifier, which is electrically connected to the detector and housed with the detector within the enclosure;

wherein an input stage of the preamplifier is directly coupled to the charge detector.

2. An image charge detection assembly as claimed in claim 1, wherein the charge detector comprises a cylindrical pickup tube, Orbitrap, Fourier Transform Ion Cyclotron Resonance detection cell, or a printed circuit board electrode.

3. An image charge detection assembly as claimed in claim 1, wherein the preamplifier comprises a single integrated circuit, a circuit board comprising a plurality of discrete components, or a hybrid integrated circuit.

4. An image charge detection assembly as claimed in claim 1, wherein the preamplifier comprises a ceramic or aluminum base printed circuit board.

5. An image charge detection assembly as claimed in claim 1, wherein the preamplifier is directly fabricated onto the charge detector.

6. An image charge detection assembly as claimed in claim 5, wherein an electrically insulating, thermally conductive substrate is deposited on a surface of the charge detector.

7. An image charge detection assembly as claimed in claim 6, wherein the substrate comprises a sputtered aluminum nitride film.

8. An image charge detection assembly as claimed in claim 1, wherein the preamplifier comprises a junction-gate field-effect transistor.

9. An image charge detection assembly as claimed in claim 1, wherein the enclosure is attached to a mounting flange via a support tube.

10. An image charge detector as claimed in claim 1, wherein the charge detector comprises a cylindrical pickup tube.

11. An image charge detection assembly as claimed in claim 1, wherein the electrically conductive shielding enclosure is housed within a vacuum chamber.

12. An image charge detector for a mass spectrometer comprising a preamplifier directly fabricated onto the charge detector.

13. An image charge detector as claimed in claim 12, wherein an electrically insulating, thermally conductive substrate is deposited on a surface of the charge detector.

14. An image charge detector as claimed in claim 13, wherein the substrate comprises a sputtered aluminum nitride film.

15. An image charge detector for a mass spectrometer comprising an input stage of a preamplifier directly coupled to the charge detector.

16. An image charge detector as claimed in claim 15, wherein the charge detector comprises a recess in an outer surface thereof with the input stage received by the recess.

17. An image charge detector as claimed in claim 16, wherein the input stage is fixed in the recess with solder.

* * * * *